(12) United States Patent
Gilbert et al.

(10) Patent No.: US 9,483,528 B1
(45) Date of Patent: Nov. 1, 2016

(54) SOCIAL RANKING METRIC

(71) Applicant: Google Inc., Mountain View, CA (US)

(72) Inventors: Evan Gilbert, Oakland, CA (US); Eric Steinlauf, Boston, MA (US); Richard Daniel Borovoy, Boston, MA (US); Julie Heather Farago, Somerville, MA (US); Dhyanesh Damania, Jersey City, NJ (US); Jeffrey Korn, New York, NY (US); Aleksandra Korolova, Palo Alto, CA (US); Jessica Staddon, Redwood City, CA (US); Zachary Maier, Mountain View, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/848,017

(22) Filed: Mar. 20, 2013

Related U.S. Application Data

(60) Provisional application No. 61/801,174, filed on Mar. 15, 2013.

(51) Int. Cl.
*G06F 7/00* (2006.01)
*G06F 17/30* (2006.01)

(52) U.S. Cl.
CPC .................................. *G06F 17/3053* (2013.01)

(58) Field of Classification Search
CPC ................ G06F 17/3053; G06F 17/30867; G06F 17/30828; H04N 21/4826
USPC ............... 707/602, 722, 723, 706, 741, 748
See application file for complete search history.

(56) References Cited

U.S. PATENT DOCUMENTS

| | | | |
|---|---|---|---|
| 2013/0268479 A1* | 10/2013 | Andler et al. ............... | 707/602 |
| 2013/0290110 A1* | 10/2013 | LuVogt et al. .......... | G06F 17/30 705/14.66 |
| 2013/0311408 A1* | 11/2013 | Bagga ................. | G06N 99/005 706/12 |
| 2014/0074856 A1* | 3/2014 | Rao ....................... | G06Q 50/01 707/748 |

\* cited by examiner

*Primary Examiner* — Md. I Uddin
(74) *Attorney, Agent, or Firm* — Patent Law Works LLP

(57) ABSTRACT

The disclosure includes a system and method for calculating social ranking scores for websites. The system includes a processor and a memory storing instructions that, when executed, cause the system to: process user interaction data describing user social activities associated with a website; classify the user social activities based on a plurality of social activity types associated with the user social activities, the plurality of social activity types including one or more characteristics describing the user social activities; determine candidate user social activities based on the classified user social activities, the candidate user social activities configured to calculate a social ranking score for the website; and calculate the social ranking score for the website based on the candidate user social activities, the social ranking score indicating a social ranking for the website.

20 Claims, 8 Drawing Sheets

SOCIAL RANKING METRIC

CROSS REFERENCE TO RELATED APPLICATIONS

This application claims priority under 35 USC §119(e) to U.S. Application No. 61/801,174, entitled "Social Ranking Metric" filed Mar. 15, 2013, the entirety of which is herein incorporated by reference.

BACKGROUND

The specification relates to determining social ranking scores for entities.

Over the last decade, social networking has become increasingly popular. A user may share online activities with other users including friends, family members, etc., via a social feed posted on a social network. A user may also socially interact with a variety of different websites. For example, the user may acknowledge an article on a website and share a comment about the picture on another website. It may be highly desirable for a user to find out whether a website is socially popular or what a social ranking for a website is like, etc.

SUMMARY

According to one innovative aspect of the subject matter described in this disclosure, a system for generating a social ranking score includes: a processor and a memory storing instructions that, when executed, cause the system to: process user interaction data describing user social activities associated with an entity; classify the user social activities based on a plurality of social activity types associated with the user social activities, the plurality of social activity types including one or more characteristics describing the user social activities; determine candidate user social activities based on the classified user social activities, the candidate user social activities being of a first social activity type or a second social activity type; and calculate the social ranking score for the website based on the candidate user social activities, the social ranking score indicating a social ranking for the website.

In general, another innovative aspect of the subject matter described in this disclosure may be embodied in methods that include: processing user interaction data describing user social activities associated with an entity; classifying the user social activities based on a plurality of social activity types associated with the user social activities, the plurality of social activity types including one or more characteristics describing the user social activities; determining candidate user social activities based on the classified user social activities, the candidate user social activities being of a first social activity type or a second social activity type; and calculating the social ranking score for the website based on the candidate user social activities, the social ranking score indicating a social ranking for the website.

Other aspects include corresponding methods, systems, apparatus, and computer program products for these and other innovative aspects.

These and other implementations may each optionally include one or more of the following operations and features. For instance, the operations further include: computing a quantity of the candidate user social activities and calculating the social ranking score for the website based on the quantity of the candidate user social activities; computing one or more qualities of the candidate user social activities and calculating the social ranking score for the website based on a combination of the quantity and the one or more qualities of the candidate user social activities; determining one or more pairs based on the candidate user social activities, each of the pairs including a user identity and a social activity type from the plurality of social activity types, determining a quantity of the one or more pairs and calculating the social ranking score for the website based on the quantity of the one or more pairs; receiving a signal responsive to a user action for changing the social ranking for the website and responsive to the signal, updating the social ranking score for the website based on the user action for changing the social ranking for the website; and determining two or more similar websites presenting same content from a same provider to users, determining social ranking scores for the two or more similar websites and combining the social ranking scores for the two or more similar websites. For instance, the features include: the candidate user social activities including user social activities that are acknowledged by a set of users. For instance, the plurality of the plurality of social activity types include at least two or more types selected from a group including: an acknowledge type; a review type; a comment type; a share type; an add-to-connection type; a watch type; a listen type; a purchase type; a search type; an install type; a view type; and a play type.

The present disclosure may be particularly advantageous in a number of respects. First, the system may take advantage of data describing user social interactions with websites that has been stored by the websites, social network entities or third party websites. The system may use the data to determine a social ranking for an entity. Second, the system may allow users to socially interact with websites more powerfully than before based on the users' historical social activities. Third, the system may feed the social ranking for websites back to users so that the users can socially interact with websites by referencing the social ranking information for websites.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
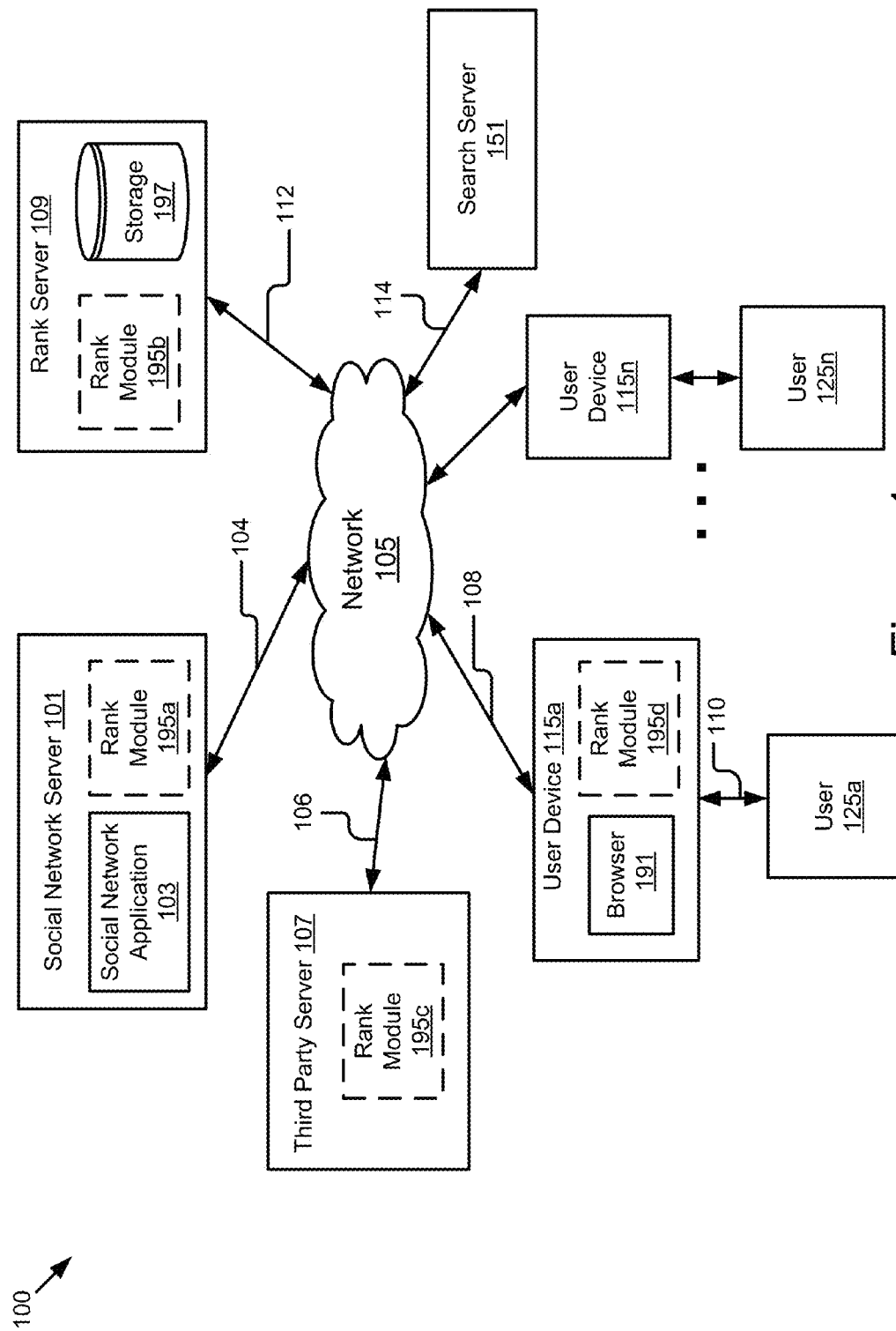
FIG. 1 is a block diagram illustrating an example system for calculating social ranking scores for websites.

FIG. 1 illustrates a block diagram of some implementations of a system 100 for calculating social ranking scores for websites. The illustrated system 100 includes user devices 115*a* . . . 115*n* (also referred to herein individually and collectively as 115) that can be accessed by users 125*a* . . . 125*n* (also referred to herein individually and collectively as 125), a social network server 101, a second server 107, a rank server 109 and a search server 151. In the illustrated implementation, these entities of the system 100 are communicatively coupled via a network 105.

The user devices 115*a*, 115*n* in FIG. 1 can be used by way of example. While FIG. 1 illustrates two user devices 115*a* and 115*n*, the present disclosure applies to a system architecture having one or more user devices 115. Furthermore, although FIG. 1 illustrates one network 105 coupled to the user devices 115, the social network server 101, the second server 107, the rank server 109 and the search server 151, in practice one or more networks 105 can be connected to these entities. Furthermore, while FIG. 1 includes one social network server 101, one second server 107, one rank server 109 and one search server 151, the architecture 100 could include one or more social network servers 101, one or more second servers 107, one or more rank servers 109 and one or more search servers 151.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

The social network server 101 can be a hardware server that includes a processor, a memory and network communication capabilities. In the illustrated implementation, the social network server 101 is coupled to the network 105 via signal line 104. The social network server 101 sends and receives data to and from one or more of the user devices 115*a*, 115*n*, the second server 107, the rank server 109 and the search server 151 via the network 105. The social network server 101 includes a social network application 103. A social network can be a type of social structure where the users 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, it should be understood that the social network server 101 and the social network application 103 can be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus. In some implementations, the social network includes a service that provides a social feed describing one or more social activities of a user 125. For example, the social feed includes one or more status updates for the user 125 describing the user's actions, expressed thoughts, expressed opinions, etc. In some implementations the social network application 103 can be stored and executed on one of the second server 107 and the rank server 109. In some implementations, the service provided by the social network application 103 is referred to as a "social network service." Other implementations can be possible. In some implementations, the services and components of the second server 107, social network server 101, and rank server 109 can be provided by the same one or more servers. Moreover, the separation of various components and servers in the implementations described herein should not be understood as requiring such separation in all implementations, and it should be understood that the described components and servers can generally be integrated together in a single component or server.

In some implementations, the social network server 101 also includes a rank module 195*a* (also referred to herein individually and collectively as 195). In some implementations, the rank module 195 can be stored on the rank server 109. For example, the rank module 195*b* can be stored on the rank server 109, which is connected to the network 105 via signal line 112. In some implementations, the rank module 195 can be included in the second server 107. For example, the rank module 195*c* can be stored in the second server 107. In some implementations, the rank module 195 can be stored on a user device 115. For example, the rank module 195*d* can be stored in the user device 115*a*. It should be understood that the rank module 195 can be stored in one of the devices and servers or in a combination of the devices and servers.

The rank module 195 can be code and routines for calculating a social ranking score for an entity based on user interactions with the entity. While the disclosed implementation is described by way of example in terms of a website as the property or entity, it should be understood that the "property" or "entity" may be any level of granularity of a web site, any level of granularity of components of the web site (e.g., web pages, articles, content, groups of web pages, etc.). For example, the rank module 195 includes code and routines for calculating a social ranking score for a website based on user social activities associated with the website. In some implementations, the rank module 195 can be implemented using hardware including a field-programmable gate array ("FPGA") or an application-specific integrated circuit ("ASIC"). In some other instances, the rank module 195 can be implemented using a combination of hardware and software. In some implementations, the rank module 195 may be stored in a combination of the devices and servers, or in one of the devices or servers.

In some implementations, the rank module 195 processes user interaction data describing user social activities associated with an entity. In some instances, the rank module 195 retrieves the user interaction data from the website. In some instances, the rank module 195 retrieves the user interaction data associated with the website from a variety of other resources. For example, the rank module 195 retrieves the user interaction data associated with the website from a social network server 101, a second server 107, a search server 151, etc. Examples of a user social activity associated with an entity can include, but not limited to, acknowledging (e.g., positively endorsing, negatively endorsing) content presented by the website (e.g., positively endorsing an article on the website), sharing with other users (e.g., sharing a picture on the website with a set of friends), adding to a social connection (e.g., adding a user 125 on the website to a set of following users 125), etc. A user social activity may also be, for example, reviewing content on the website (e.g., reviewing a post on the website, reviewing a picture on the website), commenting on the website (e.g., commenting on a post on the website, commenting on a picture on the website), watching a video or a podcast on the website, listening to a song or a podcast on the website, viewing a webpage on the website, installing an application provided by the website, purchasing goods on the website (e.g., purchasing a camera on the website), playing a game on the website, acknowledging a comment or a sharing, searching on the website (e.g., searching an article on the website, searching a product on the website), etc.

In some implementations, the rank module 195 classifies the user social activities based on one or more properties associated with the user social activities. In some instances, a property associated with a user social activity can be a user social activity type described by a verb associated with the user social activity. The verb can be a characteristic describing the social activity. Accordingly, the rank module 195 classifies the user social activities based on one or more user social activity types. Examples of a type of the user social activity can include, but not limited to, an "acknowledge" type, a "review" type, a "comment" type, a "share" type, an "add-to-connection" type, a "watch" type, a "listen" type, a "purchase" type, a "search" type, an "install" type, a "view" type, a "play" type, etc. In some instances, a property used to classify the user social activities can also include another characteristic describing the user social activity. For example, the rank module 195 classifies the user social activities based on whether the user social activity is public or private. For example, the rank module 195 classifies the user social activities based on whether the user social activity has been acknowledged by a set of users 125. For example, the rank module 195 classifies the user social activities based on whether the user social activity has met a criterion or threshold, e.g., having a higher than three stars overall review, having been positively endorsed by more than a predetermined number of users 125, etc.

In some implementations, the rank module 195 determines candidate user social activities configured to calculate a social ranking score for the website based on the classified user social activities. In some instances, the candidate user social activities can include public user social activities associated with the website. For example, the rank module 195 determines whether to use public user social activities to calculate a social ranking score for the website. In some instances, the candidate user social activities can include private user social activities associated with the website. In some instances, the candidate user social activities can include the user social activities acknowledged by a set of users 125. In some instances, the candidate user social activities can include the user social activities having met a criterion. In some instances, the rank module 195 determines to use all retrieved user social activities to calculate a social ranking score for the website.

In some implementations, the rank module 195 calculates the social ranking score for the website based on the candidate user social activities. In some instances, a social ranking score for an entity indicates a social ranking for the website. For example, a social ranking score for a website may represent the social popularity of the website. In some implementations, the rank module 195 computes a quantity of the candidate user social activities. For example, the rank module 195 computes the number of the candidate user social activities. The rank module 195 calculates the social ranking score for the website based on the quantity of the candidate user social activities. In some implementations, the rank module 195 also determines one or more qualities of the candidate user social activities and calculates the social ranking score for the website based on a combination of the quantity and the one or more qualities of the candidate user social activities. In some implementations, the rank module 195 displays (or provides for display) the social ranking score for the website. For example, the rank module 195 generates a user interface for displaying the social ranking score next to a Uniform Resource Locator ("URL"), an acknowledgement button or a share button for the website. In some implementations, the rank module 195 sends data describing the social ranking scores for websites to other components of the system 100. For example, the rank module 195 may send the data describing the social ranking scores for websites to the social network server 101 or the second server 107 for generating recommendations for users 125 regarding web pages to follow, movies to watch, applications to install, etc., based on the social ranking scores for websites. For example, the rank module 195 can also send the data describing social ranking scores for websites to the social network server 101 or the second server 107 for implement social content stream personalization for users 125. The rank module 195 will be described in further detail below with reference to FIGS. 3-7.

The second server 107 can be a hardware server that includes a processor, a memory and network communication capabilities. In the illustrated implementation, the second server 107 is coupled to the network 105 via signal line 106. The second server 107 sends and receives data to and from other entities of the system 100 via the network 105. In some instances, optionally the second server 107 includes a rank module 195c.

In some implementations, the second server 107 may also include a service module (not pictured). The service module can be code and routines for providing a service to a user 125. In some instances, the service module cooperates with the social network application 103 included in the social network server 101 to provide social services to the user 125. For example, the service module includes code and routines for providing a web page with an embedded video, an embedded link to a social game, a share button for sharing content included in the web page to other users 125, an acknowledgement button for acknowledging content included in the web page or an embedded link for installing an application to a user 125. The service module also includes code and routines for allowing the user 125 to interact with the web page, the video, the social game, to share content on the web page, to acknowledge content on the web page or to install the application. Other examples of services provided by the service module include, but not limited to, providing a news feed, publishing an article, generating a playlist, publishing a video, posting a picture, commenting on a post, adding a user 125 to a social connection, or other online services. In some implementations, a user 125 interacts with a service provided by the service module. The service module generates user interaction data describing the user interaction with the service including user social activities based on the service. For example, a user 125 comments on a news article presented on a web page provided by the service module, causing the service module to generate user interaction data describing that the user 125 has commented on the news article. The service module sends the user interaction data to rank module 195 for calculating a social ranking score for a website the user 125 has interacted with. In some implementations, the service module stores the user interaction data in the storage 197. In some implementations, the service module can be stored and executed on one of the social network server 101 and the rank server 109. The service provided by the service module can be referred to as a "first service."

The rank server 109 can be a hardware server that includes a processor, a memory and network communication capabilities. In the illustrated implementation, the rank server 109 is coupled to the network 105 via signal line 112. The rank server 109 sends and receives data to and from other entities of the system 100 via the network 105. In some implementations, the rank server 109 includes a rank module 195b and the storage 197. The components of the rank server 109 are communicatively coupled to each other.

The storage device 197 can be a non-transitory memory that stores data for providing the functionality described herein. The storage 197 may be a dynamic random access memory (DRAM) device, a static random access memory (SRAM) device, flash memory or some other memory devices. In some implementations, the storage 197 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In some implementations, the storage 197 stores user interaction data describing user social activities associated with websites described above with reference to the rank module 195. For example, the rank module 195 retrieves user interaction data associated with a website from a variety of resources and stores the user interaction data in the storage 197.

The user device 115a, 115n may be a computing device that includes a memory and a processor, for example a laptop computer, a desktop computer, a tablet computer, a mobile telephone, a personal digital assistant ("PDA"), a mobile email device, a portable game player, a portable music player, a television with one or more processors embedded therein or coupled thereto or other electronic device capable of accessing a network 105. In some implementations, the user device 115 includes a browser 191 for accessing online services. In the illustrated implementation, the user device 115a is communicatively coupled to the network 105 via signal line 108. The user 125a interacts with the user device 115a via signal line 110. The user device 115n is communicatively coupled to the network 105. The user 125n also interacts with the user device 115n. In some implementations, the rank module 195 acts in part as a thin-client application that may be stored on the user device 115a, 115n and in part as components that may be stored on one or more of the social network server 101, the third-party server 107 and the rank server 109.

The search server 151 can be a hardware server that includes a processor, a memory and network communication capabilities. In the illustrated implementation, the search server 151 is coupled to the network 105 via signal line 114. The search server 151 sends and receives data to and from other entities of the system 100 via the network 105. In some implementations, the search server 151 sends user interaction data describing a user search history associated with a search website to the rank module 195 for calculating a social ranking score for a website.

Figure 2:
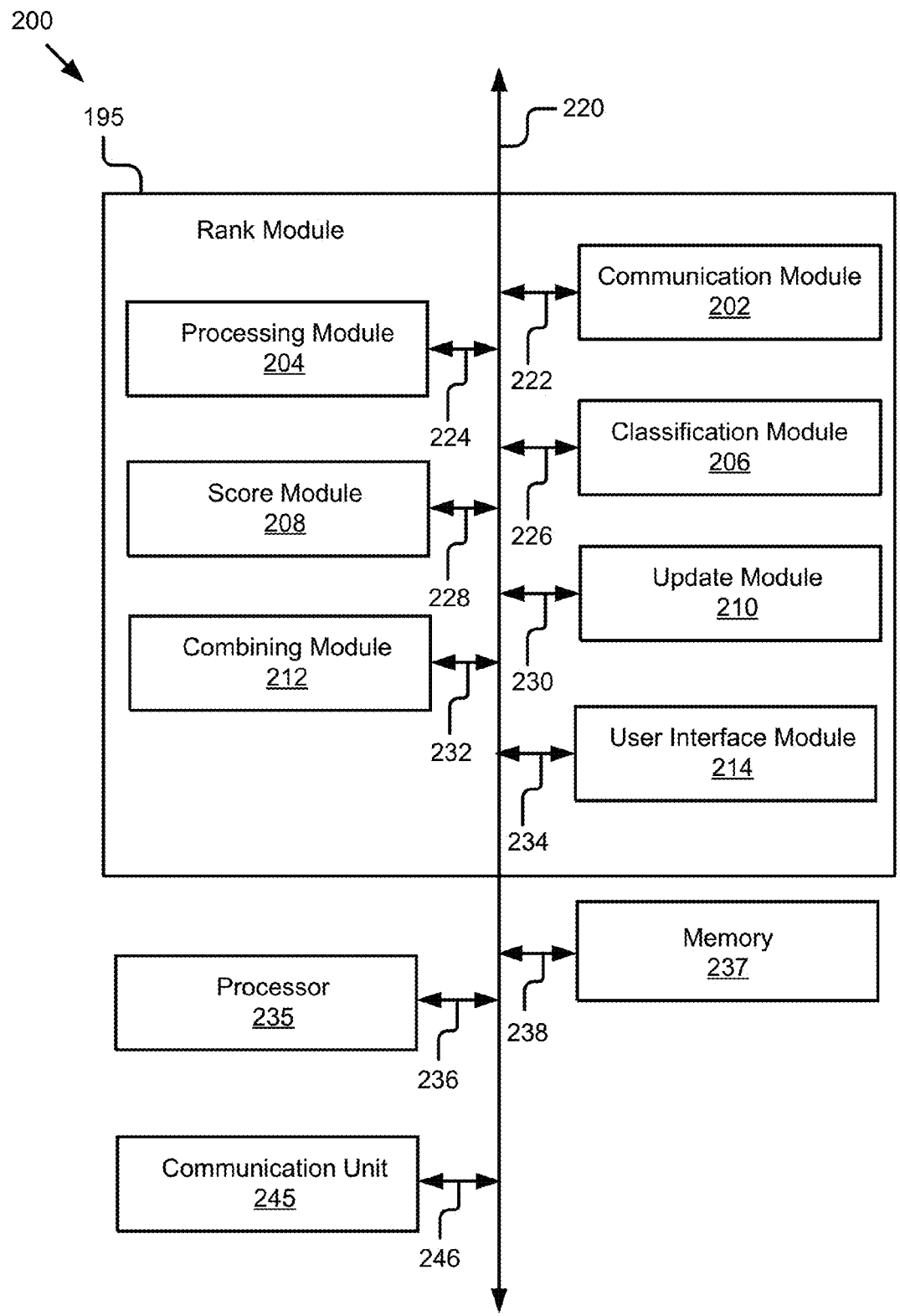
FIG. 2 is a block diagram illustrating an example of a rank module.

Referring now to FIG. 2, an example of the rank module 195 is shown in more detail. FIG. 2 is a block diagram of a computing device 200 that includes a rank module 195, a processor 235, a memory 237 and a communication unit 245 according to some examples. The components of the computing device 200 are communicatively coupled by a bus 220. In some implementations, the computing device 200 can be one of a social network server 101, a user device 115, a second server 107 and a rank server 109.

The processor 235 includes an arithmetic logic unit, a microprocessor, a general purpose controller or some other processor array to perform computations and provide electronic display signals to a display device. The processor 235 is coupled to the bus 220 for communication with the other components via signal line 236. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays and physical configurations may be possible.

The memory 237 stores instructions or data that may be executed by the processor 235. The memory 237 is coupled to the bus 220 for communication with the other components via signal line 238. The instructions or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 245 transmits and receives data to and from at least one of the user device 115, the third-party server 107, the rank server 109 and the social network server 101 depending upon where the rank module 195 may be stored. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5 or similar port for wired communication with the user device 115. In some implementations, the communication unit 245 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS and SMTP, etc.

In the illustrated implementation shown in FIG. 2, the rank module 195 includes a communication module 202, a processing module 204, a classification module 206, a score module 208, an update module 210, a combining module 212 and a user interface module 214. These components of the rank module 195 are communicatively coupled to each other via the bus 220.

The communication module 202 can be software including routines for handling communications between the rank module 195 and other components of the computing device 200. In some implementations, the communication module 202 can be a set of instructions executable by the processor 235 to provide the functionality described below for handling communications between the rank module 195 and other components of the computing device 200. In some instances, the communication module 202 can be stored in the memory 237 of the computing device 200 and can be accessible and executable by the processor 235. The communication module 202 may be adapted for cooperation and communication with the processor 235 and other components of the computing device 200 via signal line 222.

The communication module 202 sends and receives data, via the communication unit 245, to and from one or more of a user device 115, a social network server 101, a second server 107 and a search server 151. In some instances, the communication module 202 cooperates with the processing module 204 to receive, via the communication unit 245, user interaction data describing user social activities associated with a website from other entities of the system 100. In some instances, the communication module 202 receives graphical data for providing a user interface that displays a social ranking score for a website from the user interface module 214 and sends, via the communication unit 245, the graphical data to a user device 115, causing the user device 115 to present the user interface displaying the social ranking score for the website to a user 125. In some instances, the communication module 202 receives, via the communication unit 245, a signal responsive to a user action indicating a user 125 changing a social ranking for a website from the user device 115 and delivers the signal and data describing the user action to one or more appropriate components of the rank module 195, e.g., the update module 210.

In some implementations, the communication module 202 receives data from components of the rank module 195 and stores the data in the storage 197. For example, the communication module 202 receives score data describing social ranking scores for websites from the score module 208 and stores the score data in the storage 197. In some implementations, the communication module 202 retrieves data from the storage 197 and sends the data to one or more appropriate components of the rank module 195. For example, the communication module 202 retrieves score data describing a social ranking score for a website from the storage 197 and sends the score data to the update module 210 for updating the social ranking score for the website. In some implementations, the communication module 202 receives data from one or more appropriate components of the rank module 195 or the storage 197 and sends the data to other components of the system 100. For example, the communication module 202 receives data describing social ranking scores for websites from the score module 208 or the update module 210 and sends the data describing the social ranking scores for websites to the social network server 101 or the second server 107 for generating recommendations for users 125 regarding web pages to follow, movies to watch, applications to install, etc., based on the social ranking scores for websites. For example, the communication module 202 can also send the data describing social ranking scores for websites to the social network server 101 or the second server 107 for implement social content stream personalization for users 125.

The processing module 204 can be software including routines for processing user interaction data describing user social activities associated with websites. In some implementations, the processing module 204 can be a set of instructions executable by the processor 235 to provide the functionality described below for processing user interaction data describing user social activities associated with websites. In some instances, the processing module 204 can be stored in the memory 237 of the computing device 200 and can be accessible and executable by the processor 235. The processing module 204 may be adapted for cooperation and communication with the processor 235 and other components of the computing device 200 via signal line 224.

In some implementations, the processing module 204 cooperates with the communication module 202 to retrieve user interaction data describing user activities associated with a website. In some instances, the processing module 204 retrieves the user interaction data from the website. For example, the website stores user interaction data describing user interactions with the website. The processing module 204 retrieves the user interaction data from the website. In some instances, the processing module 204 retrieves user interaction data associated with a website from a variety of other resources. For example, the processing module 204 retrieves user interaction data describing user interactions with a website including user social activities associated with the website from a social network entity (e.g., a social network server 101), a third party entity (e.g., a second server 107), etc. For example, the other entities (e.g., a social network server 101, a second server 107, etc.) have agreements with the website and store user interactions with the website including user social activities associated with the website. The processing module 204 retrieves the user interaction data from these other entities that have agreements with the website.

In some implementations, the user interaction data associated with a website may describe user activities including user social activities associated with the website. Examples of a user social activity associated with a website can include, but not limited to, acknowledging (e.g., positively endorsing, negatively endorsing) content presented by the website (e.g., positively endorsing an article on the website, positively endorsing the website), sharing with other users 125 (e.g., sharing a picture on the website with a set of friends), adding to a social connection (e.g., adding a user 125 to a set of following users 125 via the website), etc. Other examples of a user social activity can include, but not limited to, reviewing content on the website (e.g., reviewing a post on the website, reviewing a picture on the website), commenting on the website (e.g., commenting on a post on the website, commenting on a picture on the website), watching a video or a podcast on the website, listening to a song or a podcast on the website, viewing a webpage on the website, installing an application provided by the website, purchasing goods via the website (e.g., purchasing a camera through the website), playing a social game provided by the website, acknowledging a comment or a sharing on the website, searching on the website (e.g., searching an article on the website, searching a product on the website), etc.

In some implementations, the processing module 204 stores the retrieved user interaction data associated with websites in the storage 197. In some implementations, the processing module 204 sends the retrieved user interaction data to the classification module 206 for classifying the user interaction data.

The classification module 206 can be software including routines for classifying the user interaction data associated with a website. In some implementations, the classification module 206 can be a set of instructions executable by the processor 235 to provide the functionality described below for classifying the user interaction data associated with a website. In some instances, the classification module 206 can be stored in the memory 237 of the computing device 200 and can be accessible and executable by the processor 235. The classification module 206 may be adapted for cooperation and communication with the processor 235 and other components of the computing device 200 via signal line 226.

In some implementations, the classification module 206 receives user interaction data describing user activities associated with a website from the processing module 204 and classifies the user activities based on one or more properties associated with the user activities. In some implementations, a property or type associated with the user activities can be a characteristic describing the user activities. The one or more properties or types associated with the user social activities can include one or more characteristics describing the user social activity. In some instances, a property associated with a user social activity can be a user social activity type described by a verb associated with the user social activity. For example, a user 125 acknowledges content (e.g., a picture, an article, a post, a video, etc.) on the website or acknowledges the website itself. Accordingly, this user social activity can be classified as an "acknowledge" type based on the verb "acknowledge." The classification module 206 classifies the user social activities based on one or more user social activity types. Examples of user social activity types can include, but not limited to, an "acknowledge" type, a "review" type, a "comment" type, a "share" type, an "add-to-connection" type, a "watch" type, a "listen" type, a "purchase" type, a "search" type, an "install" type, a "view" type, a "play" type, etc. In some implementations, the classification module 206 classifies the user social activities based on a plurality of social activity types associated with the user social activities. The plurality of user social activities can include one or more characteristics describing the user social activities, for example, one or more of the verb types described above. In some implementations, the plurality of user social activities include a plurality of characteristics describing the user social activities.

As described above, in some instances a property or type associated with a user social activity can be a user social activity type described by a verb associated with the user social activity. In other instances the social activity type is described by an adjective, for example, private, public, acknowledged or popular. For example, the classification module 206 may classify the user social activities based on whether the user social activity is public or private. In some instances, the classification module 206 may classify the user social activities based on whether the user social activity has been acknowledged by a set of users 125. In some instances, the classification module 206 may classify the user social activities based on whether the user social activity has met a criterion (e.g., whether the social activity matches a social activity type). For example, the classification module 206 may determine whether the user social activity has been reviewed by users 125 and satisfied a threshold (e.g., has been rewarded higher than three stars or any other threshold) overall review score or whether the user social activity has been positively endorsed by more than a predetermined number of users 125 (e.g., more than 5,000 users 125) and may classify the user social activities based on the determination.

In some implementations, the classification module 206 sends the classified user social activities associated with a website to the score module 208 for calculating a social ranking score for the website. In some implementations, the classification module 206 stores the classified user social activities in the storage 197.

In some implementations, some or all of these examples of classification may be implemented by the score module 208. For example, the score module 208 may determine whether the user social activity has been acknowledged by a set of users 125 and determine the user social activity acknowledged by a set of users 125 as a candidate user social activity. A candidate user social activity is a user social activity determined by the score module 208 to calculate a social score based on any appropriate criteria. For example, the score module 208 may determine the user social activity that has met a criterion as a candidate user social activity. These implementations will be described in more detail with reference to the score module 208.

The score module 208 can be software including routines for determining candidate user social activities and calculating a social ranking score based on the candidate user social activities. In some implementations, the score module 208 can be a set of instructions executable by the processor 235 to provide the functionality described below for determining candidate user social activities and calculating a social ranking score based on the candidate user social activities. In some instances, the score module 208 can be stored in the memory 237 of the computing device 200 and can be accessible and executable by the processor 235. The score module 208 may be adapted for cooperation and communication with the processor 235 and other components of the computing device 200 via signal line 228.

In some implementations, the score module 208 determines candidate user social activities based on classified user social activities associated with a website. For example, the score module 208 may determine the user social activities with an "acknowledge" type, a "share" type or an "add-to-connection" type as candidate user social activities configured to calculate a social ranking score for the website. In some instances, the score module 208 may determine user social activities with other activity types as candidate user social activities. In some instances, the score module 208 may determine to use public user social activities to calculate a social ranking score for the website. Accordingly, the determined candidate user social activities may include public user social activities associated with the website. In some instances, the candidate user social activities may include private user social activities associated with the website. In some instances, the candidate user social activities may include the user social activities acknowledged by a set of users 125. In some instances, the candidate user social activities may include the user social activities that have met a criterion. For example, the candidate user social activities may include the user social activities that have been reviewed by users 125 and satisfied a threshold for overall review score (e.g., a higher than three stars overall review or any other threshold). The candidate user social activities may also include the user social activities that have been positively endorsed by more than a predetermined number of users 125 (e.g., more than 1,000 users 125 or any other threshold). In some instances, the score module 208 may determine the candidate user social activities by selecting any combination of the classified user social activities. For example, the score module 208 may determine to use public user social activities that have been positively endorsed by more than a predetermined number of users 125 as the candidate user social activities. For example, the score module 208 may determine to use private user social activities that have an "acknowledge" type or a "share" type.

In some implementations, the score module 208 receives user social activities from the processing module 204 and determines candidate user social activities from the received user social activities. In some instances, the score module 208 may determine whether the user social activities have been acknowledged by a set of users 125 and determine the user social activities acknowledged by a set of users 125 as candidate user social activities. In some instances, the score module 208 may determine the user social activities that have met a criterion as candidate user social activities. In some instances, the score module 208 may determine to use all retrieved user social activities associated with a website to calculate a social ranking score for the website. Therefore, the candidate user social activities may include all retrieved user social activities associated with the website.

In some implementations, the score module 208 calculates a social ranking score for a website based on the candidate user social activities associated with the website. In some implementations, a social ranking score indicates a social ranking for the website. In some instances, a social ranking score represents a social popularity for the website. For example, a higher social ranking score indicates that the website has a higher social ranking among websites, e.g., the website may be socially interacted more by users 125 and therefore more socially popular among users 125. In some instances, a social ranking score is determined to be a higher social ranking score if it satisfies a threshold. In some instances, a higher social ranking score for a website may indicate that the website has been positively endorsed more by users 125 (or by a certain number of users 125) if the score is calculated based on those candidate user social activities that have been positively endorsed by more than a predetermined number of users 125. In some instances, other social signals are used by the score module 208 in determining a social ranking (e.g., social graph, social inferences, additions to groups, additions communities, diversity, randomness, etc.). In some instances, a social ranking score for a website may include a non-social component. For example, a social ranking score may include a web search ranking for the website from the search server 151. The web search ranking for the website may be calculated based on "search" type user activities and other activities related to searching.

In some implementations, the score module 208 computes a quantity of the candidate user social activities and calculates a social ranking score for the website based on the quantity of the candidate user social activities. For example, the score module 208 computes the number of the candidate user social activities and calculates a social ranking score based on the number of the candidate user social activities. For example, the social ranking score may be in proportion to the number of the candidate user social activities. In some instances, the score module 208 computes the total number of user social activities associated with a website that have been acknowledged or shared by users 125 if the score module 208 determines that candidate user social activities include user social activities that have been acknowledged or shared by users 125. The score module 208 calculates a social ranking score for the website in proportion to the total number of the user social activities that have been acknowledged or shared by users 125. The score module 208 can calculate the social ranking score based on other types of social activities. In some instances, the score module 208 calculates a social ranking score for a website based on the total number of all retrieved user social activities associated with the website if the score module 208 determines candidate user social activities include all retrieved user social activities. In some implementations, the score module 208 calculates the social ranking score based on a plurality of social activities types associated with the user social activities. The plurality of social activity types can include two or more characteristics describing the social activities.

In some implementations, the score module 208 also determines whether processed social activities satisfy a threshold. For example, the score module 208 determines one or more qualities of the candidate user social activities and calculates the social ranking score for the website based on a combination of the quantity and the one or more qualities of the candidate user social activities. For example, the determined candidate user social activities include user social activities with a "share" type, a "comment" type, a "view" type, or an "acknowledge" type. In some implementations, the score module 208 may use the one or more qualities of the candidate user social activities without combination with quantity. The score module 208 may determine that candidate social activities with a "share" type have satisfied a quality threshold (e.g., are of higher quality than any other types of candidate social activities). For example, candidate social activities with a "share" type have a satisfied a quality threshold because the system 200 is configured to assign greater weight to social activities having a "share" type versus other types of social activities (e.g., "comment" type, "acknowledged" type, "view" type, etc). Likewise, the score module 208 may determine that candidate social activities with a "comment" type have a second highest quality, candidate social activities with an "acknowledge" type have a third highest quality and candidate social activities with a "view" type have the lowest quality among the four types of candidate social activities. In some instances, the score module 208 determines a weight for each type of the candidate social activities based on their qualities. In some implementations, the weight determined by the score module 208 is associated with the quality of the social activity as described above, and configured so that social activity types having a higher quality are assigned a higher weight in proportion to their assigned quality and social activity types having a lower quality are assigned a lower weight in proportion to their assigned quality. Moreover in some implementations, there may more than one quality threshold to identify different levels of quality. For example, the score module 208 may determine the highest weight for the "share" type of candidate social activities, e.g., a weight of 0.4. The score module 208 may determine lower weights for the other types of candidate social activities. For example, the score module 208 may determine weights of 0.3, 0.2 and 0.1 for the "comment" type, the "acknowledge" type and the "view" type of the candidate social activities, respectively. In some implementations, the score module 208 calculates a social ranking score for the website by combining the numbers and the weights of the candidate social activities. For example, the score module 208 may calculate the social ranking score for the website by combining the weighed numbers of the candidate social activities. For example, assume that the score module 208 determines that the candidate user social activities include 200 "share" activities, 100 "comment" activities, 500 "view" activities and 400 "acknowledge" activities. The score module 208 multiplies the numbers of the four types of activities by the determined weights and obtains four weighted numbers, e.g., 80, 30, 80 and 50. The score module 208 then sums the weighted numbers and calculates a social ranking score of 240.

In some instances, the score module 208 may compute the number of candidate user social activities positively endorsed by 1,000-1,500 users 125, the number of candidate user social activities positively endorsed by 1,500-2,000 users 125 and the number of candidate user social activities positively endorsed by more than 2,000 users 125. For example, the numbers of the three categories of candidate social activities may be determined as 500, 300 and 100. The score module 208 may also determine a weight of 0.6, 0.3 and 0.1 for the three categories of the candidate user social activities, e.g., the candidate user social activities positively endorsed by more than 2,000 users 125, 1,500-2,000 users 125 and 1,000-1,500 users 125, respectively. The score module 208 sums the weighed numbers of the candidate social activities positively endorsed by more than 2,000 users 125, 1,500-2,000 users 125 and 1,000-1,500 users 125 (e.g., 30, 90, 10) and obtains the social ranking score for the website (e.g., 130).

In some implementations, the score module 208 determines to use a quantity of total users 125 that have interacted with the website to calculate a social ranking score for the website. For example, the score module 125 determines the number of users 125 that have socially interacted with the website (e.g., acknowledging content on the website, sharing content on the website, commenting content on the website, etc.) and calculates a social ranking score for the website based on the number of the users 125.

In some implementations, the score module 208 determines one or more pairs based on the candidate user social activities. In some instances, each of the pairs may include a user identity and a user social activity type. For example, the score module 208 determines a pair of a user 125 "X" and a "share" activity type, a pair of a user 125 "Y" and an "add-to-connection" type, etc. The score module 208 determines a quantity of the pairs (e.g., the number of the pairs) and calculates the social ranking score for the website based on the quantity of the pairs.

In some implementations, the score module 208 sends the calculated social ranking score for the website to the user interface module 214 for displaying the social ranking score for the website to users 125. In some implementations, the score module 208 may store the calculated social ranking score for the website in the storage 197 for use by the update module 210 or the combining module 212 when necessary.

The update module 210 can be software including routines for updating a social ranking score for a website. In some implementations, the update module 210 can be a set of instructions executable by the processor 235 to provide the functionality described below for updating a social ranking score for a website. In some instances, the update module 210 can be stored in the memory 237 of the computing device 200 and can be accessible and executable by the processor 235. The update module 210 may be adapted for cooperation and communication with the processor 235 and other components of the computing device 200 via signal line 230.

In some implementations, the update module 210 updates a social ranking score for a website from time to time. For example, the update module 210 cooperates with the communication module 202 to retrieve, via the communication unit 245, user social activities associated with the website that have occurred since the last update and updates the social ranking score for the website based on the retrieved user social activities in a certain time interval, e.g., every 30 minutes, every hour, every day, etc. In some implementations, the update module 210 updates a social ranking score for a website responsive to receiving a user social activity associated with the website. For example, once a user 125 performs a social activity associated with the website, e.g., the user 125 commenting on an article on the website, the update module 210 receives the user social activity and updates the social ranking score for the website based on the user social activity.

In some implementations, the update module 210 receives a signal responsive to a user action for changing the social ranking for the website. Responsive to the signal, the update module 210 updates the social ranking score for the website based on the user action for changing the social ranking for the website. For example, a user 125 positively endorses the website and the update module 210 receives a signal indicating that the user 125 intends to increase the social ranking for the website. The update module 210 updates the social ranking score for the website based on the user 125 positively endorsing the website. In some implementations, the update module 210 cooperates with the user interface module 214 to randomly allow a user 125 to increase a social ranking score for a website by a larger amount than other average users 125. For example, when a user 125 positively endorses the 100th website in the user's 125 endorsement history, the update module 210 may instruct the user interface module 214 to generate a user interface showing to the user 125 that the user 125 will be able to positively endorse the next website 10 times more powerfully than before. Once the user 125 positively endorses the next website, the update module 210 updates the social ranking score for the next website based on the 10 times factor.

In some implementations, the update module 210 applies a random value change to the social ranking score for a website to protect user privacy. For example, when updating the social ranking score based on a newly received user activity by a user 125, the update module 210 may change the social ranking score by a random value before publishing the updated score to users 125 so that the effect of an update to the social ranking score based on the newly received user activity could not with certainty be perceptible to any users 125 or cannot be reliably distinguished from the effects of updates due to other users' activity. Specifically, when a user 125 implements a private interaction with the website, e.g., the user 125 shares a picture with a set of close friends or family, this random value change in the social ranking score could protect the private activity from being directly observable and noticeable by any users 125.

The combining module 212 can be software including routines for combining social ranking scores for two or more similar websites. In some implementations, the combining module 212 can be a set of instructions executable by the processor 235 to provide the functionality described below for combining social ranking scores for two or more similar websites. For example, the combining module 212 combines the social ranking scores for two or more similar websites to determine a sum, product, integral, etc. based on the combination of the two or more similar websites. In some instances, the combining module 212 can be stored in the memory 237 of the computing device 200 and can be accessible and executable by the processor 235. The combining module 212 may be adapted for cooperation and communication with the processor 235 and other components of the computing device 200 via signal line 232.

In some implementations, the combining module 212 determines two or more similar websites. In some instances, two or more similar websites may be two or more websites that present to users 125 the same content provided by the same provider. In some instances, the combining module 212 determines the similarity of contents on pages of the two websites by applying clustering techniques and determines whether the two websites are similar. In some instances, the combining module 212 determines two or more similar websites by stripping out information from one or more Uniform Resource Locators ("URLs") for each of the websites that does not uniquely identify a webpage. In some instances, the combining module 212 uses explicitly defined tags on the webpage to identify webpages that are the same or similar. In some implementations, the combining module 212 determines social ranking scores for the two or more similar websites and sums the social ranking scores for the two or more similar websites.

The user interface module 214 can be software including routines for generating graphical data for providing user interfaces. In some implementations, the user interface module 214 can be a set of instructions executable by the processor 235 to provide the functionality described below for generating graphical data for providing user interfaces described below with reference to FIGS. 6 and 7. In some instances, the user interface module 214 can be stored in the memory 237 of the computing device 200 and can be accessible and executable by the processor 235. The user interface module 214 may be adapted for cooperation and communication with the processor 235 and other components of the computing device 200 via signal line 234.

In some implementations, the user interface module 214 generates graphical data for providing a user interface that displays one or more social ranking scores for one or more websites to users 125. For example, the social ranking scores may be displayed next to a URL for the website, an acknowledgement button or a share button associated with the website in the user interface. The user interface module 214 sends the graphical data to a user device 115 operated by a user 125, causing the user device 115 to present the social ranking scores for the websites to the user 125 via the user interface. In some implementations, the user interface module 214 generates graphical data for providing a user interface that allows a user 125 to interact with a website more powerfully than before. For example, the user interface allows a user 125 to acknowledge a website 10 times more powerfully than before.

Figure 3:
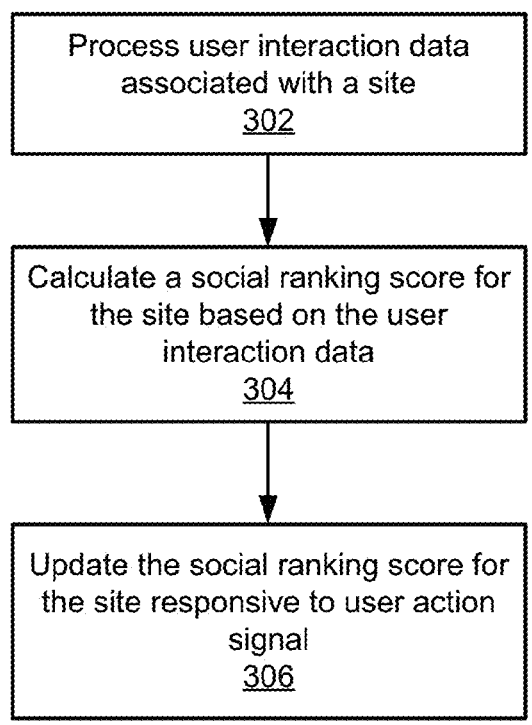
FIG. 3 is a flowchart of an example method for calculating a social ranking score for an entity.

Referring now to FIG. 3, an example of a method 300 for calculating a social ranking score for a website is described. In the illustrated implementation, the method 300 can include processing 302 user interaction data associated with a website. For example, the processing module 204 cooperates with the communication module 202 to retrieve user interaction data that describes user activities including social activities associated with a website from a variety of resources including the website itself, social network entities and third party entities that provide the user interaction data associated with the website. The method 300 can include calculating 304 a social ranking score for the website based on the processed user interaction data associated with the website. For example, the score module 208 determines candidate user social activities from the processed user interaction data, computes a quantity of the candidate user social activities, and calculates a social ranking score for the website based on the quantity of the candidate user social activities associated with the website. The processed user interaction data may describe social activities having a plurality of social activity types. The method 300 may also include updating 306 the social ranking score for the website responsive to a user action signal. For example, a user 125 acknowledges the website and the update module 210 receives a signal indicating the user 125 acknowledging the website and updates the social ranking score for the website based on the user 125 acknowledging the website.

Figure 4A:
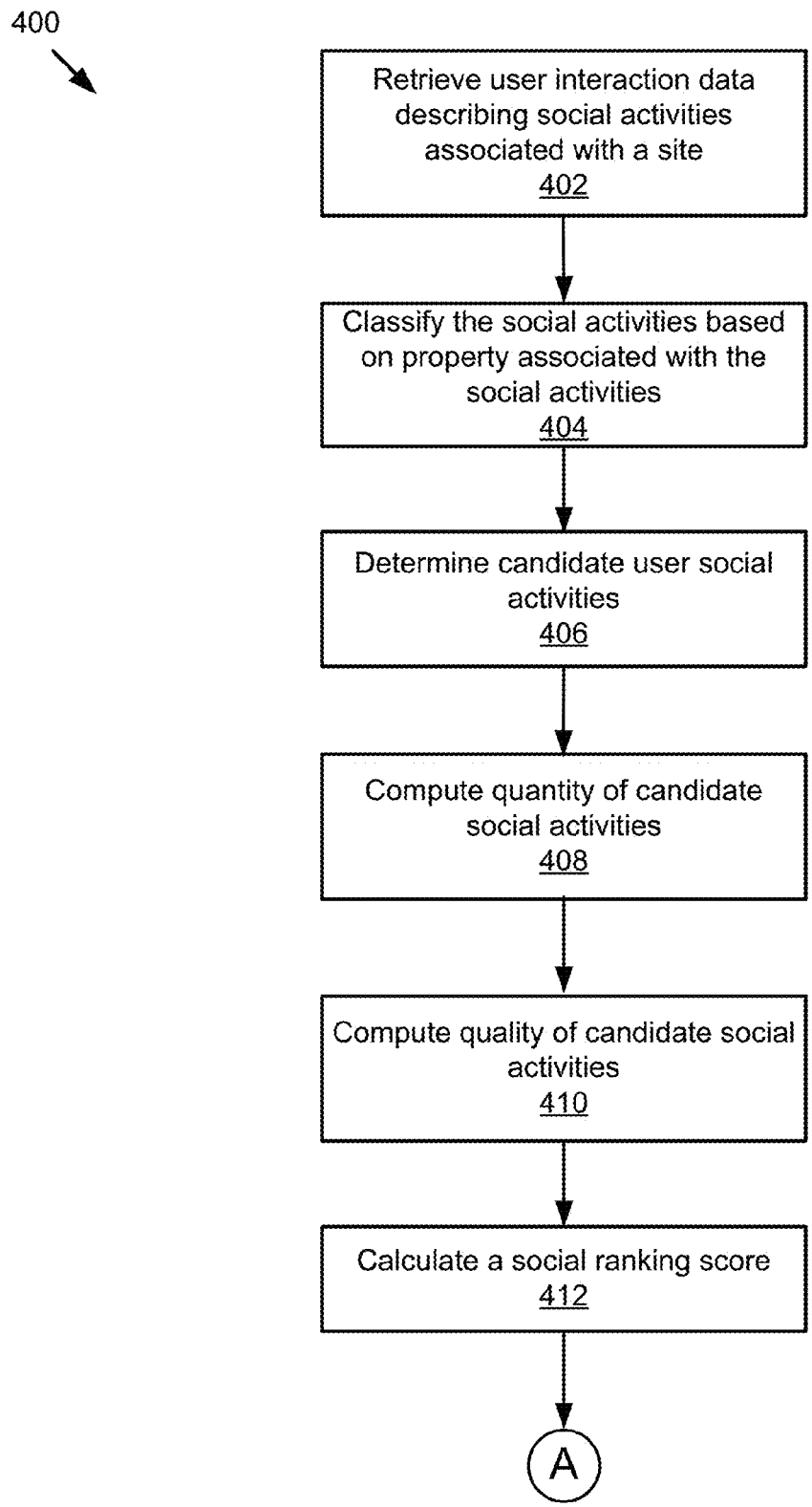
FIGS. 4A-4B are flowcharts of an example method for calculating a social ranking score for an entity.
Figure 4B:
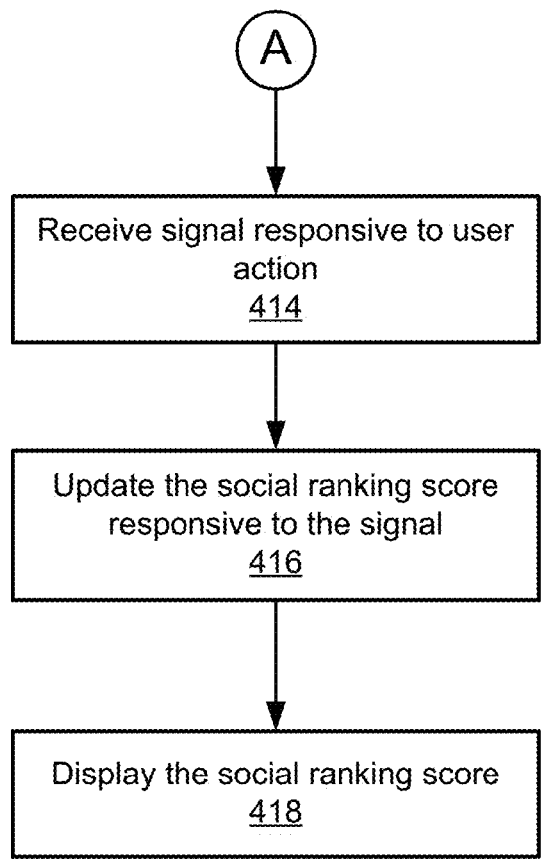

Referring now to FIGS. 4A-4B, another example of a method 400 for calculating a social ranking score for a website is described. Turning to FIG. 4A, the method 400 can include retrieving 402 user interaction data describing social activities associated with a website. For example, the processing module 204 cooperates with the communication module 202 to retrieve, via the communication unit 245, user interaction data that describes user activities including social activities associated with a website from a variety of resources including the website itself, social network entities and third party entities that provide the user interaction data associated with the website. Examples of a social activity associated with a website can include, but not limited to, acknowledging (e.g., positively endorsing, negatively endorsing) content presented by the website (e.g., positively endorsing an article on the website, positively endorsing the website), sharing with other users 125 (e.g., sharing a picture on the website with a set of friends), adding to a social connection (e.g., adding a user 125 on the website to a set of following users 125), etc. Other examples of a user social activity can include, but not limited to, reviewing content on the website (e.g., reviewing a post on the website, reviewing a picture on the website), commenting on the website (e.g., commenting on a post on the website, commenting on a picture on the website), watching a video or a podcast on the website, listening to a song or a podcast on the website, viewing a webpage on the website, installing an application provided by the website, purchasing goods via the website (e.g., purchasing a camera through the website), playing a social game provided by the website, acknowledging a comment or a sharing on the website, searching on the website (e.g., searching an article on the website, searching a product on the website), etc.

The method 400 may also include classifying 404 the user interaction data based on one or more properties associated with the user interaction data. For example, the classification module 206 classifies the user interaction data describing user social activities based on whether the user social activity has been positively endorsed by more than a predetermined number of users 125 (e.g., more than 1,000 users 125 or any other threshold) or has been reviewed by users 125 and rewarded a certain high (e.g., higher than three stars or any other threshold) overall review score. The method 400 can also include determining 406 candidate user social activities based on the classified user social activities. More specifically, determining candidate user social activities based on the classified user social activities includes determining whether the candidate user social activities have a first social activity type or a second social activity type. For example, the score module 208 determines if the user social activities are an endorsement type or a share type. If so, they are candidate user social activities. If not, they are not candidate user social activities. In another example, the score module 208 determines user social activities positively endorsed by more than a predetermined number of users 125 as candidate user social activities. In some implementations, the method 400 includes classifying 404 the user interaction data based on a plurality of social activity types associated with the user social activities. The plurality of user social activities can include one or more characteristics describing the user social activities.

The method 400 can include computing 408 a quantity of the candidate user social activities. For example, the score module 208 computes the number of the candidate user social activities. In some instances, the score module 208 computes the number of each category of candidate user social activities. For example, the score module 208 computes the number of candidate user social activities positively endorsed by 1,000-1,500 users 125, the number of candidate user social activities positively endorsed by 1,500-2,000 users 125 and the number of candidate user social activities positively endorsed by more than 2,000 users 125. The method 400 can also include computing 410 a quality of the candidate user social activities. For example, the score module 208 may determine that a candidate user social activity positively endorsed by more users 125 has a higher quality. The score module 208 determines a weight for each category of the candidate user social activities. For example, the score module 208 determines a weight of 0.6, 0.3 and 0.1 for the candidate user social activities positively endorsed by more than 2,000 users 125, 1,500-2,000 users 125 and 1,000-1,500 users 125, respectively. The method 400 can include calculating 412 a social ranking score for the website based on the quantity or quality of the candidate social activities. For example, the score module 208 calculates a social ranking score for the website based on the number of the candidate user social activities positively endorsed by more than a predetermined number of users 125. In some instances, the score module 208 calculates a social ranking score for the website by combining the quantity and the quality of the candidate user social activities. For example, the score module 208 calculates the social ranking score for the website by combining the weighed numbers of the candidate social activities positively endorsed by more than 2,000 users 125, 1,500-2,000 users 125 and 1,000-1,500 users 125. For example, the score module 208 calculates the social ranking score for the website by summing the weighed numbers of the candidate social activities positively endorsed by more than 2,000 users 125, 1,500-2,000 users 125 and 1,000-1,500 users 125.

Referring now to FIG. 4B, the method 400 can include receiving 414 a signal responsive to a user action for changing the social ranking score for the website. For example, a user 125 positively endorses the website and the update module 210 receives a signal indicating that the user 125 intends to increase the social ranking for the website. The method 400 can also include updating 416 the social ranking score for the website responsive to the signal. For example, the update module 210 updates the social ranking score for the website based on the user social activity of positively endorsing the website. The method 400 can also include displaying the social ranking score for the website. For example, the user interface module 214 receives the social ranking score for the website from the update module 210 or the score module 208 and generates graphical data for providing a user interface that displays the social ranking score for the website next to a URL for the website, an acknowledgement button or a share button associated with the website in the user interface.

Figure 5:
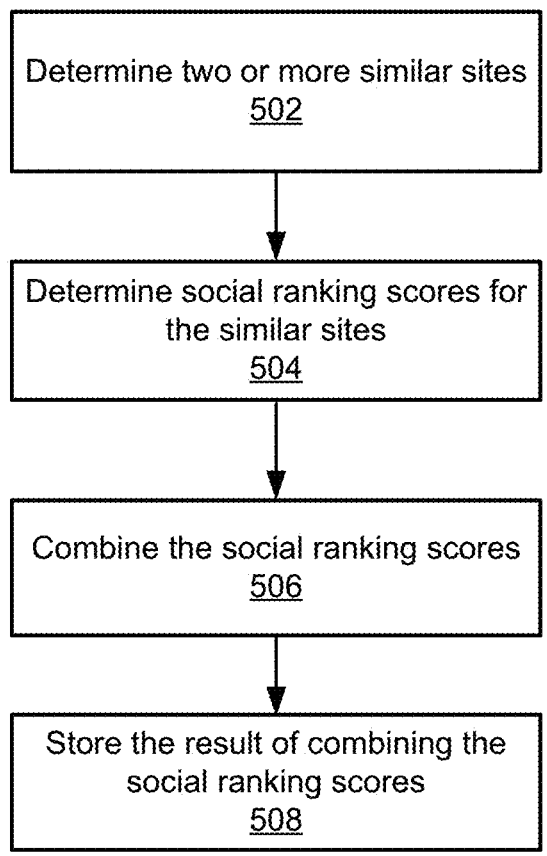
FIG. 5 is a flowchart of an example method for combining social ranking scores for two or more similar websites.

Referring now to FIG. 5, an example of a method 500 for combining social ranking scores for two or more similar websites is described. In the illustrated implementation, the method 500 can include determining 502 two or more similar websites. For example, the combining module 212 determines two or more similar websites that contain the same content provided by the same provider. The method 500 can also include determining 504 social ranking scores for the two or more similar websites. For example, the combining module 212 can cooperates with the score module 208 to determine social ranking scores for the two or more similar websites. In some instances, the combining module 212 retrieves the social ranking scores for the two or more similar websites from the storage 197. The method 500 can include combining 506 the social ranking scores for the two or more similar websites. For example, the combining module 212 sums the determined social ranking scores for the two or more similar websites. The method 500 can also include storing 508 the result of combining the social ranking scores in the storage 197.

Figure 6:
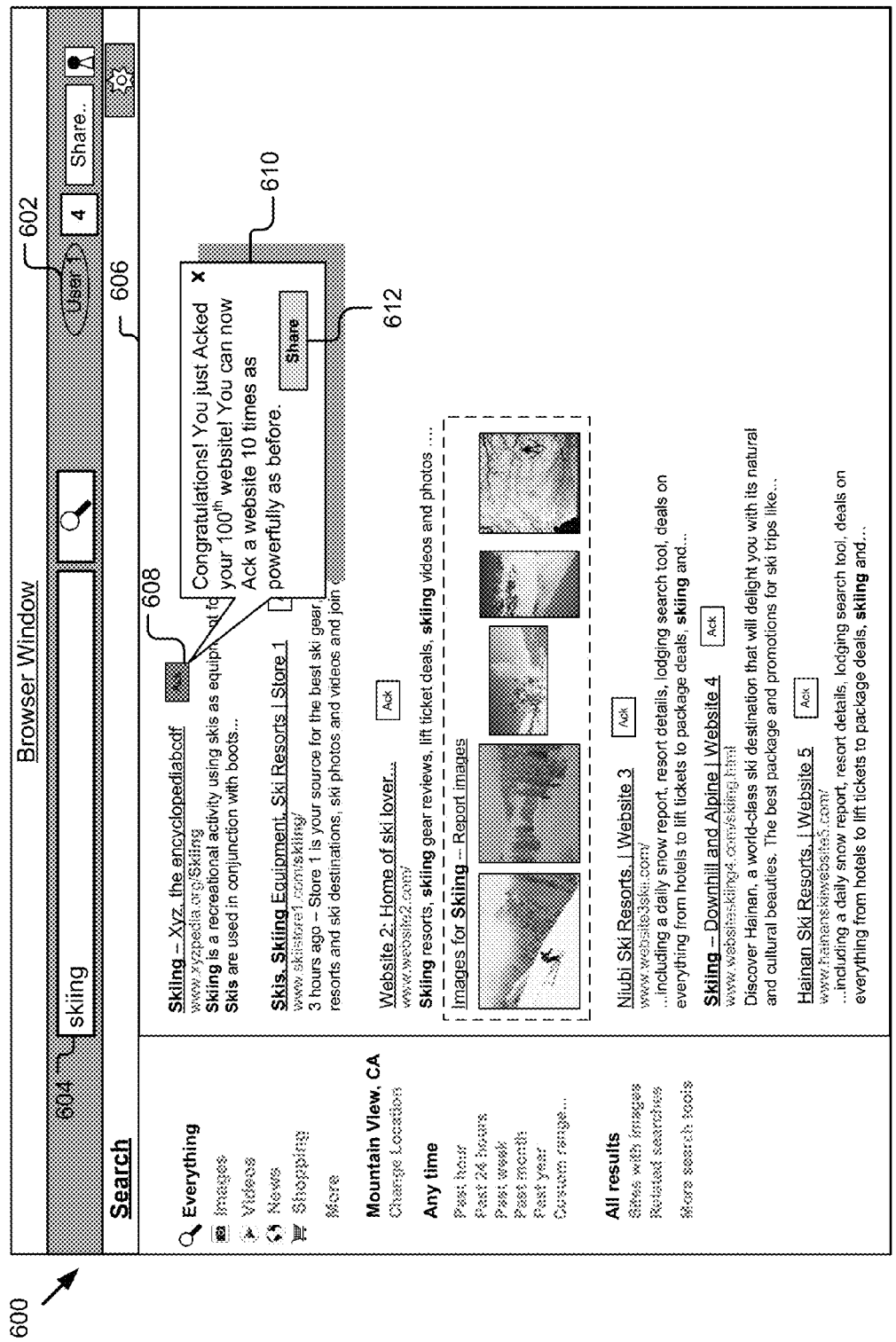
FIG. 6 is a graphic representation of an example user interface for allowing a user to increase a social ranking for a property or entity.

FIG. 6 is a graphic representation of an example user interface 600 for allowing a user 125 to increase a social ranking for a property or entity. While the disclosed implementation is described by way of example in terms of a website as the property or entity, it should be understood that the "property" or "entity" may be any level of granularity of a web site, any level of granularity of components of the web site (e.g., web pages, articles, content, groups of web pages, etc.). The user interface 600 includes a graphical representation of a user name 602 (e.g., "User 1") for a user 125. The user interface 600 includes a search box 604 that allows the user 125 to input information for searching on the web. In the illustrated example, the user 125 inputs "skiing" in the search box 604. The user interface 600 also includes a graphical representation of a display box 606 that shows search results. For example, the display box 606 shows search results for "skiing." The user interface 600 includes an "acknowledge" button 608 that is clickable for the user 125 to acknowledge the content associated with the "acknowledge" button 608. In the illustrated example, the content associated with the "acknowledge" button 608 can be a website included in the search results for "skiing." In some instances, the user 125 clicks the "acknowledge" button 608, causing the rank module 195 described above to update the social ranking score for the website. In the illustrated example, the user 125 clicks the "acknowledge" button 608, causing the rank module 195 to display a message box 610 pointing to the "acknowledge" button 608. For example, the message box 610 displays a message for the user 125 which states "Congratulations! You just Acked your 100$^{th}$ website! You can now Ack a website 10 times as powerfully as before." For example, the user 125 can acknowledge a website 10 times as powerfully as before and the rank module 195 will calculate the social ranking score for the website accordingly if the user 125 acknowledges the website. The message box 610 includes a "share" button that is clickable for the user 125 to share the message with other users 125, e.g., friends, family, etc.

Figure 7:
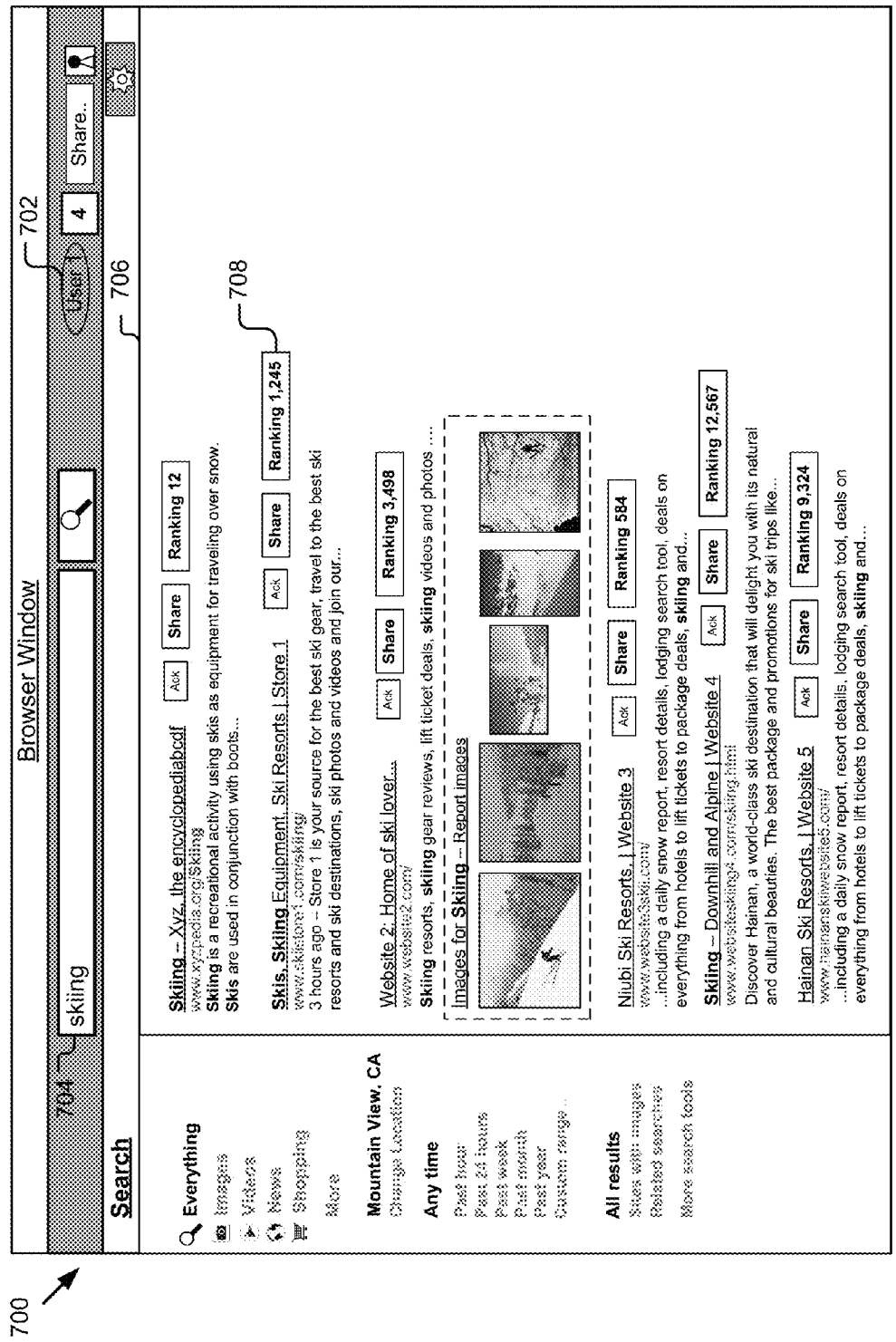
FIG. 7 is a graphic representation of an example user interface for displaying social ranking scores for a property or entity.

FIG. 7 is a graphic representation of an example user interface 700 for displaying social ranking scores for a property or entity. Again, the disclosed implementation is described by way of example in terms of a website as the property or entity; however, it should be understood that the "property" or "entity" may be any level of granularity of a web site, any level of granularity of components of the web site (e.g., web pages, articles, content, groups of web pages, etc.). The user interface 700 includes a graphical representation of a user name 702 (e.g., "User 1") for a user 125. The user interface 700 includes a search box 704 that allows the user 125 to input information for searching on the web. In the illustrated example, the user 125 inputs "skiing" in the search box 704. The user interface 700 also includes a graphical representation of a display box 706 that shows search results. For example, the display box 706 shows search results for "skiing." The user interface 700 also includes a ranking score box 708 displaying a social ranking score for a website listed in the search results. For example, the ranking score box 708 can be displayed next to an "acknowledge" button and a "share" button associated with the website.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

The invention claimed is:

1. A method comprising:
processing user interaction data describing user social activities associated with a content;
classifying the user social activities based on a plurality of social activity types associated with the user social activities, the plurality of social activity types including a characteristic describing the user social activities;
determining candidate user social activities based on the classified user social activities, the candidate user social activities being one from a group of a first social activity type and a second social activity type;
determining a first weight for the first social activity type including a first characteristic and a second weight for the second social activity type including a second characteristic, the first weight and the second weight based on a number of positive user social activities associated with the content of that type;
calculating a social ranking score for the content based on the first weight and the second weight by computing one or more qualities of the candidate user social activities; and calculating the social ranking score for the content based on a combination of the quantity and the one or more qualities of the candidate user social activities, the social ranking score indicating a popularity of the content among other users in a social graph; and
generating a recommendation including the content based on the social ranking score, the social ranking score indicating that the popularity of the content satisfies a threshold.

2. The method of claim 1, wherein calculating the social ranking score for the content further comprises:
computing a quantity of the candidate user social activities; and
calculating the social ranking score for the content based on the quantity of the candidate user social activities.

3. The method of claim 1, further comprising:
determining one or more pairs based on the candidate user social activities, each of the pairs including a user identity and a social activity type from the plurality of social activity types;
determining a quantity of the one or more pairs; and
calculating the social ranking score for the content based on the quantity of the one or more pairs.

4. The method of claim 1, wherein the candidate user social activities include user social activities that are acknowledged by a set of users.

5. The method of claim 1, further comprising:
receiving a signal responsive to a user action for changing the popularity of the content; and
responsive to the signal, updating the social ranking score for the content based on the user action for changing the popularity of the content.

6. The method of claim 1, wherein the plurality of social activity types include at least two or more types selected from a group including: an acknowledge type; a review type; a comment type; a share type; an add-to-connection type; a watch type; a listen type; a purchase type; a search type; an install type; a view type; and a play type.

7. The method of claim 1, further comprising:
determining two or more similar websites presenting same content from a same provider to users;
determining social ranking scores for the two or more similar websites; and
combining the social ranking scores for the two or more similar websites.

8. A computer program product comprising a non-transitory computer usable medium including a computer readable program, wherein the computer readable program when executed on a computer causes the computer to:
process user interaction data describing user social activities associated with a content;
classify the user social activities based on a plurality of social activity types associated with the user social activities, the plurality of social activity types including a characteristic describing the user social activities;
determine candidate user social activities based on the classified user social activities, the candidate user social activities being one from a group of a first social activity type and a second social activity type;
determine a first weight for the first social activity type including a first characteristic and a second weight for the second social activity type including a second characteristic, the first weight and the second weight based on a number of positive user social activities associated with the content of that type;
calculate a social ranking score for the content based on the first weight and the second weight by computing one or more qualities of the candidate user social activities; and calculating the social ranking score for the content based on a combination of the quantity and the one or more qualities of the candidate user social activities, the social ranking score indicating a popularity of the content among other users in a social graph; and
generate a recommendation including the content based on the social ranking score, the social ranking score indicating that the popularity of the content satisfies a threshold.

9. The computer program product of claim 8, wherein calculating the social ranking score for the content further comprises:
computing a quantity of the candidate user social activities; and
calculating the social ranking score for the content based on the quantity of the candidate user social activities.

10. The computer program product of claim 8, wherein the computer readable program when executed on the computer causes the computer to also:
    determine one or more pairs based on the candidate user social activities, each of the pairs including a user identity and a social activity type from the plurality of social activity types;
    determine a quantity of the one or more pairs; and
    calculate the social ranking score for the content based on the quantity of the one or more pairs.

11. The computer program product of claim 8, wherein the candidate user social activities include user social activities that are acknowledged by a set of users.

12. The computer program product of claim 8, wherein the computer readable program when executed on the computer causes the computer to also:
    receive a signal responsive to a user action for changing the popularity of the content; and
    responsive to the signal, update the social ranking score for the content based on the user action for changing the popularity of the content.

13. The computer program product of claim 8, wherein the plurality of social activity types include at least two or more types selected from a group including: an acknowledge type; a review type; a comment type; a share type; an add-to-connection type; a watch type; a listen type; a purchase type; a search type; an install type; a view type; and a play type.

14. The computer program product of claim 8 wherein the computer readable program when executed on the computer causes the computer to also:
    determine two or more similar websites presenting same content from a same provider to users;
    determine social ranking scores for the two or more similar websites; and
    combine the social ranking scores for the two or more similar websites.

15. A system comprising:
    a processor; and
    a memory storing instructions that, when executed, cause the system to:
        process user interaction data describing user social activities associated with a content;
        classify the user social activities based on a plurality of social activity types associated with the user social activities, the plurality of social activity types including a characteristic describing the user social activities;
        determine candidate user social activities based on the classified user social activities, the candidate user social activities being one from a group of a first social activity type and a second social activity type;
        determine a first weight for the first social activity type including a first characteristic and a second weight for the second social activity type including a second characteristic, the first weight and the second weight based on a number of positive user social activities associated with the content of that type;
        calculate a social ranking score for the content based on the first weight and the second weight by computing one or more qualities of the candidate user social activities; and calculating the social ranking score for the content based on a combination of the quantity and the one or more qualities of the candidate user social activities, the social ranking score indicating a popularity of the content among other users in a social graph; and
        generate a recommendation including the content based on the social ranking score, the social ranking score indicating that the popularity of the content satisfies a threshold.

16. The system of claim 15, wherein calculating the social ranking score for the content further comprises:
    computing a quantity of the candidate user social activities; and
    calculating the social ranking score for the content based on the quantity of the candidate user social activities.

17. The system of claim 15, wherein the instructions, when executed, cause the system to also:
    determine one or more pairs based on the candidate user social activities, each of the pairs including a user identity and a social activity type from the plurality of social activity types;
    determine a quantity of the one or more pairs; and
    calculate the social ranking score for the content based on the quantity of the one or more pairs.

18. The system of claim 15, wherein the candidate user social activities include user social activities that are acknowledged by a set of users.

19. The system of claim 15, wherein the plurality of social activity types include at least two or more types selected from a group including: an acknowledge type; a review type; a comment type; a share type; an add-to-connection type; a watch type; a listen type; a purchase type; a search type; an install type; a view type; and a play type.

20. The system of claim 15, wherein the instructions, when executed, cause the system to also:
    receive a signal responsive to a user action for changing the popularity of the content; and
    responsive to the signal, update the social ranking score for the content based on the user action for changing the popularity of the content.

* * * * *